United States Patent [19]

Autage et al.

[11] 4,326,697

[45] Apr. 27, 1982

[54] VALVES WITH NON-LUBRICATED PLUG

[76] Inventors: Roger Autage, 22 rue Jeanne d'Arc, Résidence Domrémy, Sèvres; Georges Dupont, 13 rue Questroy, Epinay S/Seine, both of France

[21] Appl. No.: 132,096

[22] Filed: Mar. 20, 1980

Related U.S. Application Data

[63] Continuation of Ser. No. 812,136, Jul. 1, 1977, abandoned, which is a continuation of Ser. No. 417,709, Nov. 21, 1973, abandoned, which is a continuation of Ser. No. 875,827, Nov. 12, 1969, abandoned.

[30] Foreign Application Priority Data

Nov. 15, 1968 [FR] France .................................. 174018

[51] Int. Cl.³ .............................................. F16K 25/00
[52] U.S. Cl. .................................... 251/174; 251/315; 251/317
[58] Field of Search ........................ 251/174, 315, 317

[56] References Cited

U.S. PATENT DOCUMENTS

| | | | |
|---|---|---|---|
| 1,488,296 | 3/1924 | Stevens | 251/174 |
| 2,661,926 | 12/1953 | Resek | 251/174 X |
| 2,701,117 | 2/1955 | Bashark | 251/174 |
| 2,858,098 | 10/1958 | Sanctuary | 251/315 |
| 3,146,988 | 9/1964 | Riopelle | 251/315 |
| 3,195,857 | 7/1965 | Shafer | 251/315 X |
| 3,269,692 | 8/1966 | Shafer | 251/317 X |
| 3,269,695 | 8/1966 | Grove | 251/174 |
| 3,270,772 | 9/1966 | Rakus | 251/315 X |
| 3,545,721 | 12/1970 | Shafer | 251/315 X |
| 3,580,268 | 5/1971 | Shafer | 251/315 X |

*Primary Examiner*—Harold W. Weakley
*Attorney, Agent, or Firm*—Hubbell, Cohen, Stiefel & Gross

[57] ABSTRACT

Valves or cocks with rotary plug in which the plug is provided with flexible gaskets of annular shape located symmetrically with respect to the plane passing through the axis of rotation of the plug and the axis of the cylindrical conduit of the plug, sealing seats borne by the valve body, the seats being arranged in such a manner that they come into contact with the gaskets borne by the plug when the latter is in closed position.

2 Claims, 4 Drawing Figures

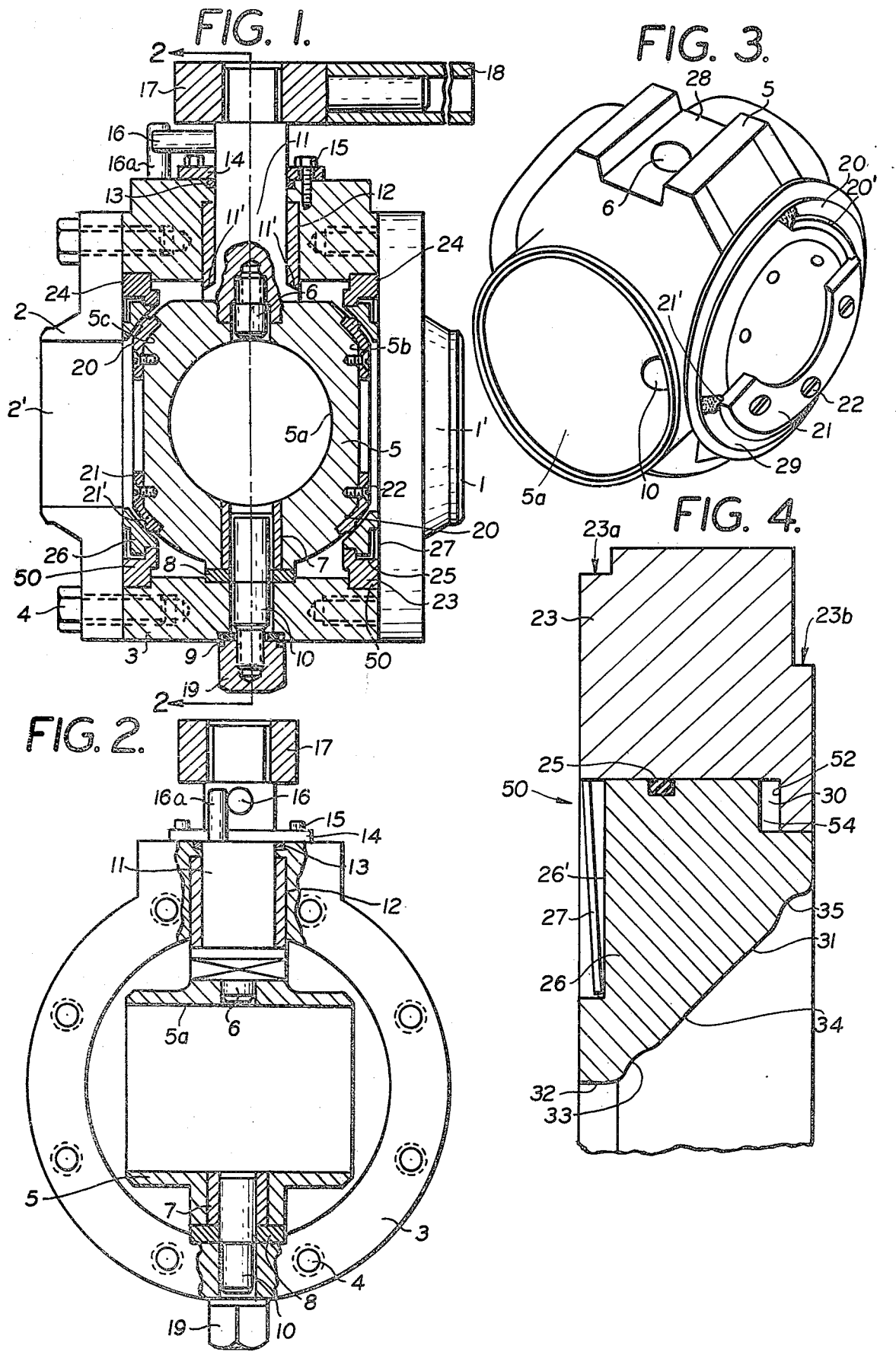

ed with the invention along a plane parallel to the
VALVES WITH NON-LUBRICATED PLUG This is a continuation, of application Ser. No. 812,136, filed July 1, 1977 which is a continuation of Ser. No. 417,709, filed Nov. 21, 1973 which is a continuation of Ser. No. 875,827, filed Nov. 12, 1969 all of Roger Autage et al, all abandoned.

BACKGROUND OF THE INVENTION

Field of the Invention

The present invention relates to a valve having a stationary body adapted to be connected upstream and downstream to pipes, a rotary plug resting on the said stationary body and sealing seats located within the fixed body and applied against the rotary plug when the latter is in closed position.

Such valves may be used within a very broad pressure range extending from a deep vacuum to several hundred atmospheres, the passage diameter of which valves may reach a value of several tens of centimeters.

The valve body consists preferably of two flanges which clamp together on opposite sides of an annular part, the assembly being effected preferably by screwing.

The annular parts bears two diametrically opposite ports in which the pins bearing the rotary plug house themselves.

SUMMARY

The valve in accordance with the invention is formed of a valve body, a rotary plug having a cylindrical conduit resting by means of trunnions on the valve body, operated by means of an external device, the plug being provided with flexible gaskets of annular shape located symmetrically with respect to the plane containing the axis of rotation of the plug and the axis of the cylindrical conduit of the plug, sealing seats borne by the valve body, which seats are made of two parts which can move in translation with respect to each other, the gaskets and the seats being arranged in such a manner that they come into contact by suitable rotation of the plug bringing the latter into closed position.

In accordance with one characteristic of the invention, the outer part of each of the seats is fixed with respect to the valve body, the assembling being effected in tight manner, and the inner part, which is capable of sliding in translation with respect to said fixed part, has at least one bearing surface in the form of a spherical region intended to come into contact with the flexible gasket borne by the rotary plug.

In accordance with another characteristic of the invention, the stationary part of the seat has a shoulder which limits the stroke of the moving part, the said moving part receiving permanently a thrust from a preferably annular spring of small stroke, tightness being obtained between the stationary part and the moving part of the seat by means of a joint.

The isolating ability obtained with this valve is substantially total, both in the upstream and the downstream directions. The isolation is retained up to temperatures of 250° C.

The operating torque is very small. As a matter of fact, only the moving part of the seats exerts upon the closing of the valve a pressure against the gaskets under the effect of the pressure difference applied.

By the dimensioning the cross-section of the moving part, one has a means for connecting the valve to an external operating device which is capable of applying a given torque.

The seats are moved over by the gaskets which slide on them, contact taking place between the gasket whose active part is located on a sphere concentric with the plug and the moving part of the seat having the shape of a spherical zone. The contact stroke between the gaskets and the seats upon operation of the valve is greatly reduced due to the fact that the absolute tightness is destroyed as soon as the moving part of the seat, being no longer subjected to the pressure difference, leaves its resting place and immediately frees the gasket.

This valve is particularly adapted for the closing of conduits conveying liquids which contain impurities.

The invention will be better understood from the following description of an embodiment of the valve, the description being illustrated in the attached figures.

BRIEF DESCRIPTION OF THE DRAWINGS

FIG. 1 is a sectional view through a valve in accordance with the invention along a plane parallel to the axis of flow of fluids therethrough;

FIG. 2 is a sectional view taken along the line 2—2 in FIG. 1;

FIG. 3 shows a perspective view of the plug of the valve; and

FIG. 4 is a fragmentary sectional view of the sealing seats.

DETAILED DESCRIPTION OF THE PREFERRED EMBODIMENT

In the drawings, 1 is a flange provided at its central portion with a connection capable of being welded to a pipeline element and having an opening 1' for the passage of the fluids. 2 is the second flange, symmetrical to the first with respect to a plane passing through the axis of the plug and perpendicular to the axis of flow of the fluid through its opening 2'. At 3 there has been shown an annular part bearing a boss, which part will be referred to as the valve body. The flanges 1 and 2 are screwed onto the valve body 3 by means of screws 4. Two recesses are machined near the ends of the valve body 3. The role of the corresponding shoulders will be described below. 5 is the rotary plug. This plug has roughly the shape of a nut pierced along an axis with a hollow cylinder or passage 5a of the same cross-section as the inner cross-section of the connections or apertures 1', 2' of the flanges 1 and 2 respectively. This plug 5 is borne by two trunnions 10 and 11 which rest on the valve body and the axis of which forms the axis of rotation of the plug. The trunnion 11 terminates in two flats centered on its axis. Trunnion 11 is rigidly connected with the plug 5 in which it fits, by a screw 6. This screw 6 causes the axis of the plug and the axis of the trunnion to coincide. 7 is a ring of self-lubricating material rigidly connected with the plug 5. This ring surrounds the trunnion 10. A disc of self-lubricating material 8 is interposed between the base of the plug and the inner face of the cylindrical body 3.

The trunnion 10 is fitted into a complementary recess in the valve body 3 and thereupon a solid nut 19 clamps on a sealing gasket 9. Around the trunnion 11 there has been placed a cylinder 12 of self-lubricating material which makes it possible to assure the rotation of trunnion 11 in the valve body 3 with very low friction. This cylinder 12 which is mounted with substantial clamping force in the body 3 supports the trunnion 11, a shoulder 11' of the latter resting against the cylinder 12. A disc 14, clamping a annular gasket 13, is fastened on the body 3 by means of screws 15. The trunnion 11 furthermore bears a finger 16 perpendicular to its axis which, in cooperation with two stops, one of which is shown at 16a, limits the rotation of the plug to a quarter revolution, which assures cooperation of one and the same sealing gasket.

An operating part 17 provided with an extension 18 makes it possible to pivot the plug 5 a quarter of a revolution. This plug bears two sealing gaskets 20 located symmetrically in two planes parallel to a plane passing through the axis of rotation of the plug and the axis of the hollow cylinder borne by the said plug. Furthermore, these two sealing gaskets the cross-section of which is T-shaped are so located that vertical portions 20' of the T's extend a few millimeters beyond the surface of the plug to define a semi toric bead.

21 is a washer which holds the gasket 20 between a shoulder 5c or 5b provided in the plug 5 and a projection 21' on the part 21. This part 21 is screwed onto the body of the plug by screws 22.

The reference numeral 23 designates a pair of stationary annular parts one for each of the sealing seats 50. These annular parts 23 are clamped between the flanges 1 and 2 and the shoulders of the recesses provided in the valve body 3. Sealing gaskets 24 mounted in grooves made around the parts 23 are clamped at the same time as the latter by the flanges 1 and 2. These parts 23 each bear a shoulder on their inner contour. At 26 there is shown the movable part of each sealing seat 50. On the outer periphery these movable parts are of general annular shape and roughly trapezoidal cross-section and bear a shoulder complementary to the shoulder borne by the parts 23, and a groove in which a sealing part 25 is engaged. As best seen in FIG. 4, the inner surface of this part 25 is machined in the form of a spherical zone, while in the large base of the trapezoid 26 there has been machined a recess 26' in which a spring 27 of small stroke is housed.

In the valve body 3, there are tapholes intended to receive the screws 4 which fasten the two connection flanges 1 and 2 thereto.

Referring now to FIG. 3, a perspective view of the plug 5 is shown. As stated above, 6 is the centering screw which assures the connection of the plug 5 and of the screwdriver blade which forms the termination of the trunnion 11 (not shown), which screwdriver blade fits in the recess 28 borne by the plug 5. In FIG. 3, one of the two sealing gaskets 20 is shown partly in section. The section includes a rectangular part over which there is the semi-toric bead 20'. The fastening part 21 screwed onto the plug 3 by the screws 22 is also shown in section. One can note the shape of the portion 29 of the plug which surrounds the sealing gasket. This portion together with the part 21 constitutes a roughly spherical zone borne by a sphere of a diameter slightly less than the diameter of the sphere bearing the spherical zones of the parts 26, two spheres being concentric and having as their common center the point of intersection of the axis of rotation of the plug and the axis of the hollow cylinder borne by the plug.

The bead 20' of the sealing gasket 20 is slightly greater in thickness than the difference in radius of the two spheres defined above. Thus in the movement of rotation which assures the closing of the valve, the gaskets 20 act on the sealing seats 20 tangentially by the sliding of two spheres on each other. The friction is low as long as there is no total closure. The compression of the gasket 20 by the moving part 26 of the sealing seat takes place only gradually as a function of the loss in load created between the gasket 20 and the portion 26. The final closing is completed abruptly by the displacement of the moving part 26 under pressure from spring 27, and the angle of rotation of the plug during this movement is very slight of the order of a few degrees, which rotation is resisted by substantial friction. Furthermore, as the closing is effected by the fluid pressure differential the closing is more vigorous the greater the pressure difference between upstream and downstream.

Referring now to FIG. 4, the details of the sealing seats 50 are shown. The fixed portion 23 of sealing seat 50 is, as previously described, of annular shape with its cross-section roughly rectangular. This portion 23 has two notches, 23a and 23b respectively, on its outer part and a shoulder 52 on its inner part.

The moving part 26 of the sealing seat 50 is also of annular shape and as already described, of roughly trapezoidal cross-section. The outer diameter of this part 26 is equal, except for a small frictional clearance, to the inside diameter of the part 23.

On its outer face, the part 26 has a groove in which there is arranged the sealing ring 25. In the large base of the trapezoid there is provided the recess 26' in which spring 27 is lodged. As already noted, this spring has a small stroke and serves to remove the part 26 away from the support which it finds on the flanges 1 and 2. Grooves may possibly extend the recess so that at the time of the closing of the valve the fluid can penetrate into the recess of the spring 27, thus applying the sealing seat against the gasket 20.

A chamber 30 defined by the confronting shoulders 52 and 54 borne respectively by the parts 23 and 26 is shown in FIG. 4. The width of this chamber constitutes the stroke or extent of movement of the part 26.

At 31 there is shown the profile of the inner surface of the moving part 26. This profile includes a cylindrical surface portion 32 connected to a toric zone 33 which is in turn connected to a spherical zone 34 which in its turn is connected to a second toric zone 35. The connections are assured by surfaces of radius of curvature sufficient so that the sealing gaskets 20 are not damaged upon their movement of translation. The toric zones and the surfaces which connect them with the spherical zones constitute loading and unloading zones of the gaskets.

This valve is assembled in the following manner. The liner 12 is engaged in the body 3 and is clamped therein. In the recess defined by this liner there is placed the trunnion 11. The latter is placed in such a manner that the flats borne by the trunnion 11 are parallel to the intended direction of flow of the fluids. The disc 8 is then put in place. The plug is equipped with the liner 7 and with the sealing rings 20, their retention rings 21 being fastened to the plug by the screws 22. The plug equipped in this manner is positioned in the valve body 3. Thereupon through the recess provided therefor, screw 6 is screwed into the trunnion 11. The trunnion 10 is positioned from the inside of the plug 5, it being put in place with substantial clamping. The sealing gasket 9 is placed in position, whereupon the cap 19 is locked thereover. The seats 23 and 26 and the sealing gasket 25 are mounted, whereupon this assembly is placed in the previously described recesses provided for this purpose in the body 3. The sealing gasket 24 and then the spring 27 are put in place. The flanges 1 and 2 are then screwed onto the valve body 3. Thereupon the sealing gasket 13 is mounted, followed by the disc 14 which is fastened to the valve body. The fingers 16, 16a and the operating device 17 and 18 are then fastened.

The operation of this valve can be described as follows:

Assuming the plug is in open position, i.e., ninety degrees to that shown in FIGS. 1 and 2, the sealing seats 23 and 26 are at rest and the fluid flows through the central passage 5a in plug 5. The rotation by a quarter revolution of the plug causes an increase in the loss of pressure head of fluid in the valve, since when the quarter revolution has almost been completed, the sealing gaskets 20 engage the moving parts 26 of the sealing parts 50. Gaskets 20 are placed both on the toric zones and on the spherical zones of the seats. While the torque required to rotate plug 5 up to this point has been negligible, upon gaskets 20 engaging parts 26, the operating torque becomes greater. Upon the engagement being effected, the moving part of the seat 26 moves away from its position of rest both under the action of the spring 27 at the start of its stroke and of the difference in pressure between the upstream and downstream sides of the valve. At this time the end of the rotation of the plug takes place and the gaskets 20 apply themselves against the spherical zone and the valve tightness is complete. It is unimportant that the gaskets 20 deform under load as a result of the taking-up due to the displacement of the seat, which displacement is effected under the action of the fluid pressure.

While we have herein shown and described the preferred form of the present invention and have suggested modifications therein, other changes and modifications may be made therein within the scope of the appended claims without departing from the spirit and scope of this invention.

What we claim is:

1. A valve comprising a valve body having an inlet and an outlet; a plug having a fluid passage therein; means for rotatably mounting said plug in said valve for movement between an open position in which said passage communicates with both said inlet and said outlet and a closed position in which said passage is out of such communication, said plug having a pair of opposed spherical surface portions defined by a sphere having a center located at the intersection of the axis of rotation of said plug and the axis of said passage; and means for sealing said valve in said closed condition comprising a pair of annular sealing gaskets secured respectively to said spherical surface portions of said plug; a pair of sealing seats mounted on said valve body in surrounding relation with said inlet and outlet, each of said sealing seats including a fixed annular member secured to said valve body, an annular bearing member mounted for axial movement relative to said fixed annular member, means for biasing said annular bearing member toward said plug, the portion of each bearing member engageable by said annular gasket having a spherical surface portion, additional rotary movement of said plug toward said closed position being effective for moving said annular bearing member adjacent said biasing means, each movable bearing member having said spherical surface portion flanked by a marginal recessed toric surface symmetrically disposed with respect to the axis of rotation of said plug on said spherical surface portions so as to form a marginal groove adjacent said bearing member spherical surface portion, said gaskets having compressible portions protruding beyond said plug surface for progressive free engagement within said marginal groove and subsequent compressive engagement with said spherical surface portions to complete said valve seal when said plug is moved into said closed position, the portions of said sealing seats engageable by said gaskets being in the form of portions of a sphere having the same center as said spherical surface portions of said plug, said protruding portion being progressively deformable against said spherical surface portions as said protruding portion moves into engagement therewith from said marginal toric surface upon said plug being moved into said closed position, said protruding portion being in a non-deformed released configuration unless said plug is adjacent said closed position.

2. A valve comprising a valve body having an inlet and an outlet; a plug having a fluid passage therein; means for rotatably mounting said plug in said valve for movement between an open position in which said passage communicates with both said inlet and said outlet and a closed position in which said passage is out of such communication, said plug having a pair of opposed spherical surface portions defined by a sphere having a center located at the intersection of the axis of rotation of said plug and the axis of said passage; and means for sealing said valve in said closed condition comprising a pair of annular sealing gaskets secured respectively to said spherical surface portions of said plug; a pair of sealing seats mounted on said valve body in surrounding relation with said inlet and outlet, each of said sealing seats including a fixed annular member secured to said valve body, an annular bearing member mounted for axial movement relative to said fixed annular member, means for biasing said annular bearing member toward said plug, the portion of each bearing member engageable by said annular gasket having a spherical surface portion, additional rotary movement of said plug toward said closed position being effective for moving said annular bearing member adjacent said biasing means, said biasing means being spring means, and each movable bearing member having said spherical surface portion flanked by a recessed toric surface symmetrically disposed with respect to the axis of rotation of said plug on said spherical surface portions, said gaskets having compressible portions protruding beyond said plug surface for progressively deformable engagement with said spherical surface portions to complete said valve seal when said plug is moved into said closed position, the portions of said sealing seats engageable by said gaskets being in the form of portions of a sphere having the same center as said spherical surface portions of said plug.

* * * * *